US012586594B2

(12) United States Patent
Bruse et al.

(10) Patent No.: US 12,586,594 B2
(45) Date of Patent: Mar. 24, 2026

(54) GUIDING AMBISONIC AUDIO COMPRESSION BY DECONVOLVING LONG WINDOW FREQUENCY ANALYSIS

(71) Applicant: GOOGLE LLC, Mountain View, CA (US)

(72) Inventors: Martin Bruse, Tyreso (SE); Jyrki Antero Alakuijala, Wollerau (CH); Moritz Firsching, Basel (CH); Thomas Fischbacher, Gattikon (CH); Sami Boukortt, Zurich (CH); Evgenii Kliuchnikov, Thalwil (CH)

(73) Assignee: GOOGLE LLC, Mountain View, CA (US)

( * ) Notice: Subject to any disclaimer, the term of this patent is extended or adjusted under 35 U.S.C. 154(b) by 200 days.

(21) Appl. No.: 18/472,841

(22) Filed: Sep. 22, 2023

(65) Prior Publication Data

US 2024/0105190 A1 Mar. 28, 2024

Related U.S. Application Data

(60) Provisional application No. 63/376,669, filed on Sep. 22, 2022.

(51) Int. Cl.
*G10L 19/022* (2013.01)

(52) U.S. Cl.
CPC .................................. *G10L 19/022* (2013.01)

(58) Field of Classification Search
CPC ... G10L 19/022; G10L 19/0204; G10L 19/02; G10L 21/0232; G10L 19/038; G10L 19/12; H04B 1/667
See application file for complete search history.

(56) References Cited

U.S. PATENT DOCUMENTS

| | | | | |
|---|---|---|---|---|
| 5,359,696 | A * | 10/1994 | Gerson | G10L 19/12 704/265 |
| 9,576,583 | B1 * | 2/2017 | Betts | G10L 21/0232 |
| 2004/0078205 | A1 * | 4/2004 | Liljeryd | H04B 1/667 704/503 |
| 2012/0029923 | A1 * | 2/2012 | Rajendran | G10L 19/038 704/500 |
| 2017/0140774 | A1 * | 5/2017 | Hashimoto | G10L 21/0232 |
| 2024/0077059 | A1 * | 3/2024 | Strunz | F03D 7/02 |

* cited by examiner

*Primary Examiner* — Huyen X Vo
(74) *Attorney, Agent, or Firm* — Brake Hughes Bellermann LLP

(57) ABSTRACT

A method including receiving an audio signal, generating a transformed audio signal by transforming the audio signal using a plurality of windows each separated in time, generating an interpolated audio signal by interpolating the transformed audio signal, generating a separated audio signal by applying a mask to the interpolated audio signal, and compressing the separated audio signal.

21 Claims, 6 Drawing Sheets

GUIDING AMBISONIC AUDIO COMPRESSION BY DECONVOLVING LONG WINDOW FREQUENCY ANALYSIS

CROSS REFERENCE TO RELATED APPLICATION

This application claims the benefit of U.S. Provisional Application 63/376,669, filed Sep. 22, 2022, the disclosure of which is incorporated herein by reference in its entirety.

FIELD

Embodiments relate to audio compression.

BACKGROUND

Audio compression can be guided by modeling human hearing. Modeling hearing can allow for use of more bits for audio events that the human ears are sensitive to. The hearing models can be based on frequency analysis such as the Fourier transform.

SUMMARY

Implementations relate to compressing an audio signal(s) using a combination of a long window/short step integral transform, an interpolation operation, and a masking model followed by additional audio compression operations.

In a general aspect, a device, a system, a non-transitory computer-readable medium (having stored thereon computer executable program code which can be executed on a computer system), and/or a method can perform a process with a method including receiving an audio signal, generating a transformed audio signal by transforming the audio signal using a plurality of windows each separated in time, generating an interpolated audio signal by interpolating the transformed audio signal, generating a separated audio signal by applying a mask to the interpolated audio signal, and compressing the separated audio signal.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, and/or structures utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

Prior to communicating and/or storing audio the audio can be compressed. Compressing the audio reduces the size (e.g., reduces the number of bits) of the audio. Therefore, compressing the audio reduces the amount of memory used to store the audio and/or reduces the bandwidth used to communicate the audio. Accordingly, compressing the audio can improve a user experience by minimizing the resources used to store and/or communicate audio.

Compressing audio can include sampling the audio, transforming the audio into the frequency domain, and compressing the sampled audio. Sampling the audio can include using a window (e.g., a filter) as the audio is received (e.g., from a microphone). Transforming the audio into the frequency domain can include using a Fourier transform (or similar) to transform the windowed audio from the time domain to the frequency domain. A Fourier transform (or similar) can require use of a constant window size for frequency integration. However, an ideal model may use Bark-scale bandwidth division. A technical problem can be that ambisonic compression can generate a large quantity of data when compared to traditional audio compression. The larger quantity of data can increase the need for efficient and precise guidance for adaptive quantization.

A technical problem associated with classic frequency analysis using Fourier transforms, or other integration techniques, can be having to choose between high time precision or high frequency precision. Choosing a long window for the integration can provide high frequency resolution and low time resolution. By contrast, choosing a short window can provide low frequency resolution and high time resolution.

For psychoacoustic modeling this choice can be technically problematic because human hearing can have the ability to detect changes in both frequency and time on very small scales. For example, a human can consciously detect timing differences of around 20 ms for the onset of sounds, and the human brain uses timing differences of as little as ten microseconds for source localization. Further, humans can detect frequency differences of as little as one hertz (Hz).

Figure 1:
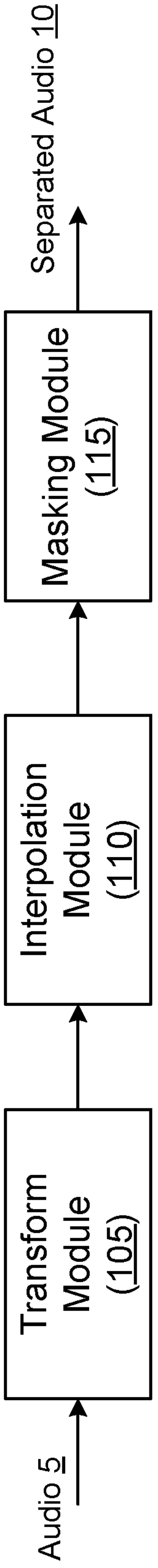
FIG. 1 illustrates a block diagram of a signal flow for audio separation according to an example implementation.

Example implementations can solve these technical problems by using the combination of a long window/short step integral transform, an interpolation operation, and a masking model. For example, as shown in FIG. 1 the long window/short step integral transform can be applied to an audio signal and the result can be interpolated and masked. The result can be the input to additional audio compression operations. For example, the result can be quantized using an adaptive quantization algorithm. A technical effect can be that the audio (e.g., ambisonics audio) can be compressed with high time precision and high frequency precision.

FIG. 1 illustrates a block diagram of a signal flow for audio separation according to an example implementation. As shown in FIG. 1, the signal flow includes a transform module 105 block, an interpolation module 110 block, and a masking module 115 block.

The transform module 105 can be configured to generate a windowed block of audio 5 and transform the windowed block of audio from the time domain to the frequency domain. The windowed block of audio can be generated using a long window/short step windowing function. The transform can be an integral transform. For example, the transform can be a Fast Fourier transform (FFT), discrete cosine transform (DCT), and the like. Therefore, the transform module 105 can be configured to use a long window/short step integral transform. In an example implementation, the step size and window size can be implemented as time blocks having a time span (e.g., 5 ms). For example, the step size can be one (1) time block (e.g., 5 ms) and the window size can be five (5) time blocks (e.g., 25 ms). For example, the long window/short step integral transform can be an integral transform with a long enough window to capture the lowest frequencies of interest at a high resolution, for example a window in the range of 0.1-0.2 seconds and a step size small enough to capture high resolution time differences, for example a step size in the range of 5-20 ms.

The interpolation module 110 can be configured to interpolate values associated with each frequency in a block of transformed audio. In an example implementation, the interpolation can be implemented using an infinite impulse response filter that uses the summing properties of the integral transforms to compute the average amplitudes for the frequencies captured by the integral transforms on a step-size level of time resolution. Continuing the example above, the step size can be one (1) time block and the window size can be five (5) time blocks. Therefore, in an example implementation, the interpolation can be based on one step size over five (5) consecutive windows. Therefore, the interpolation can compute the average amplitudes for the frequencies in one time block over five (5) consecutive time block windows. See FIGS. 3A and 3B for additional details.

The masking module 115 can be configured to use a masking model to separate the audio in the time-frequency domain. Masking (or applying a mask to) an audio signal can dampen the perception (or detection) of audio. Therefore, masking can include filtering (e.g., using frequency bands or bandpass filters) such that some audio bands (e.g., tones) can be heard (or detected) and some audio bands (e.g., tones) cannot be heard (or detected). The human ear can distinguish between, for example, 24 bands. Therefore, masking (or applying a mask) in relation to the human ear can include using a masking model with 24 bandpass filters each having a center frequency and bandwidth.

In some implementations, the masking model can be a function that applies the masking properties of human hearing (e.g., masking properties representing or modeling human hearing) to the high time-and-frequency resolution output of the interpolation module 110. The masking model can be based on, for example, the Bark frequency scale. The Bark frequency scale can be configured to model the bands of human hearing and a masking function configured to identify how louder sounds hide less loud sounds to output the subjective loudness of each frequency. Therefore, the separated audio 10 can include frequency bands (e.g., within a human hearing range) over time where the frequency bands include the subjective loudness of each frequency.

Sound loudness is a subjective term describing, for example, a perception of acoustic pressure of the ear's perception of audio signals in the frequency range of human hearing (herein referred to as subjective loudness). Subjective loudness can be related to sound intensity. For example, the sound intensity can be associated with the ear's sensitivity to the frequencies contained in the audio. Subjective loudness can be an attribute of auditory sensation. Subjective loudness can sometimes be scaled from quiet to loud. The separated audio 10 can describe the human perception of the analyzed sound as a single number describing an aspect of the sound or the difference between the analyzed sound and a previously analyzed sound.

Figure 2:
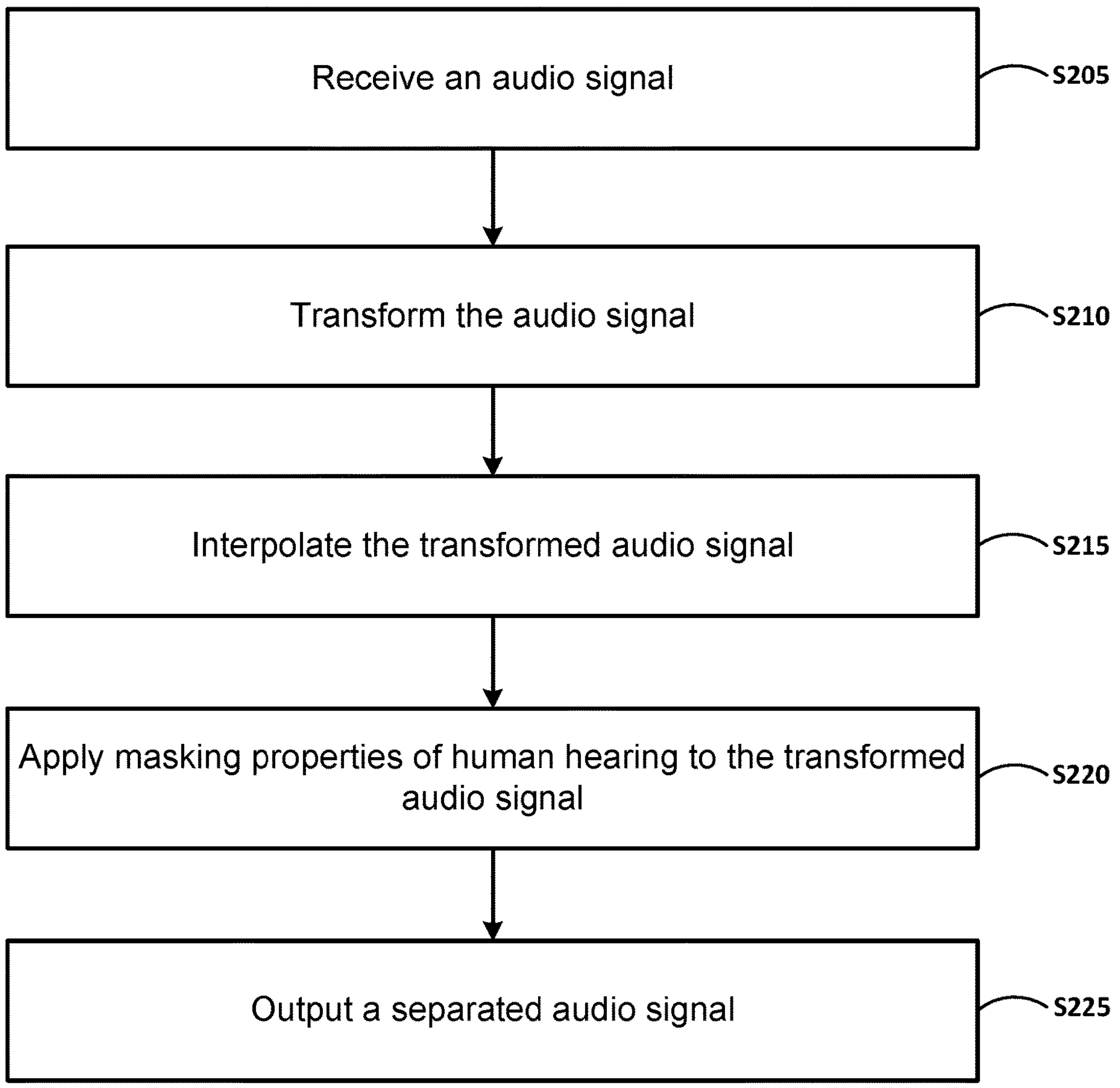
FIG. 2 illustrates a block diagram of a method for audio separation according to an example implementation.

FIG. 2 illustrates a block diagram of a method for audio separation according to an example implementation. As shown in FIG. 2, in step S205 an audio signal is received. For example, the audio signal can be a stored audio signal, a live audio signal, a streaming audio signal, an audio conference signal, an MP3 file, an Opus file, and/or the like. The audio signal can be an ambisonic audio signal.

In step S210 the audio signal is transformed. For example, the audio signal can be windowed and transformed. A windowed block of audio can be transformed from the time domain to the frequency domain. The windowed block of audio can be generated using a long window/short step windowing function. The transform can be an integral transform. For example, the transform can be a Fast Fourier transform (FFT), discrete cosine transform (DCT), and the like. Therefore, the transform module 105 can be configured to use a long window/short step integral transform. In an example implementation, the step size and window size can be implemented as time blocks having a time span (e.g., 5 ms). For example, the step size can be one (1) time block (e.g., 5 ms) and the window size can be five (5) time blocks (e.g., 25 ms).

In step S215 the transformed audio signal is interpolated. For example, amplitude values associated with each frequency in a block of transformed audio can be interpolated. In an example implementation, the interpolation can be implemented using an infinite impulse response filter that uses the summing properties of the integral transforms to compute the average amplitudes for the frequencies captured by the integral transforms on a step-size level of time resolution. Continuing the example above, the step size can be one (1) time block and the window size can be five (5) time blocks. Therefore, in an example implementation, the interpolation can be based on one step size over five (5) consecutive windows. Therefore, the interpolation can compute the average amplitudes for the frequencies in one time block over five (5) consecutive time block windows.

In step S220 masking properties of human hearing (e.g., masking properties representing human hearing) are applied to the interpolated audio signal. For example, a masking model can be used to separate the audio in the time-frequency domain. The masking model can be a function that applies the masking properties of human hearing to the high time-and-frequency resolution output of the interpolated audio signal. The masking model can be based on, for example, the Bark frequency scale. The Bark frequency scale can be configured to model the bands of human hearing and a masking function describing how louder sounds hide less loud sounds to output the subjective loudness of each frequency.

In step S225 a separated audio signal is output. For example, the masked audio signal can be output as a separated audio signal. The separated audio signal can be the input to additional audio compression operations. For example, the separated audio signal can be quantized using an adaptive quantization algorithm and/or an entropy encoding process. In an alternative implementation, the separated audio signal can be used in processes other than audio compression. For example, the separated audio signal can be used to train a machine learned model. The separated audio signal can be stored in a memory. The separated audio signal ban be played on an audio playback device. The separated audio can be streamed to a device for audio playback.

Figure 3A:
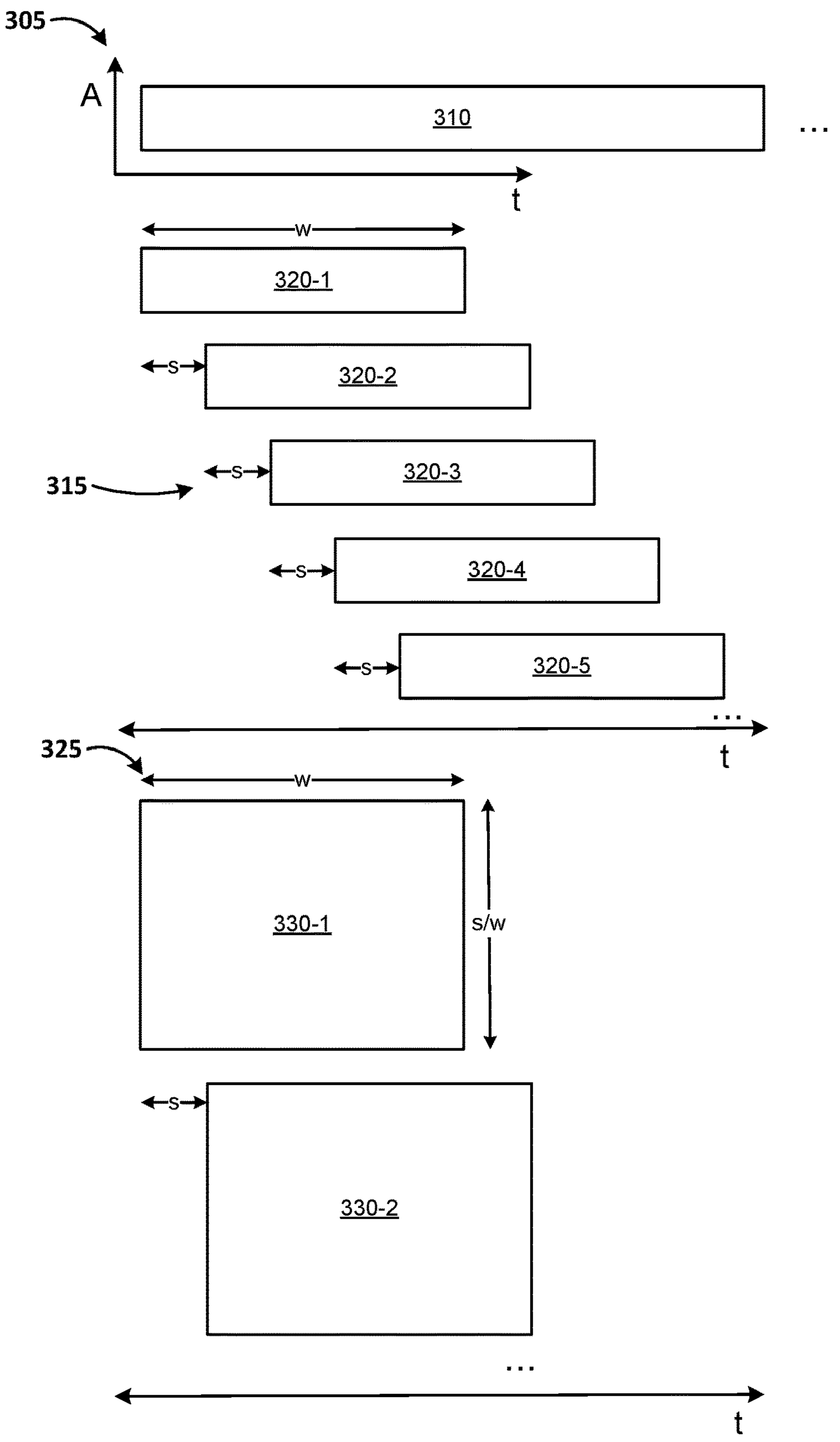
FIGS. 3A and 3B pictorially illustrate a flow for audio separation according to an example implementation.
Figure 3B:
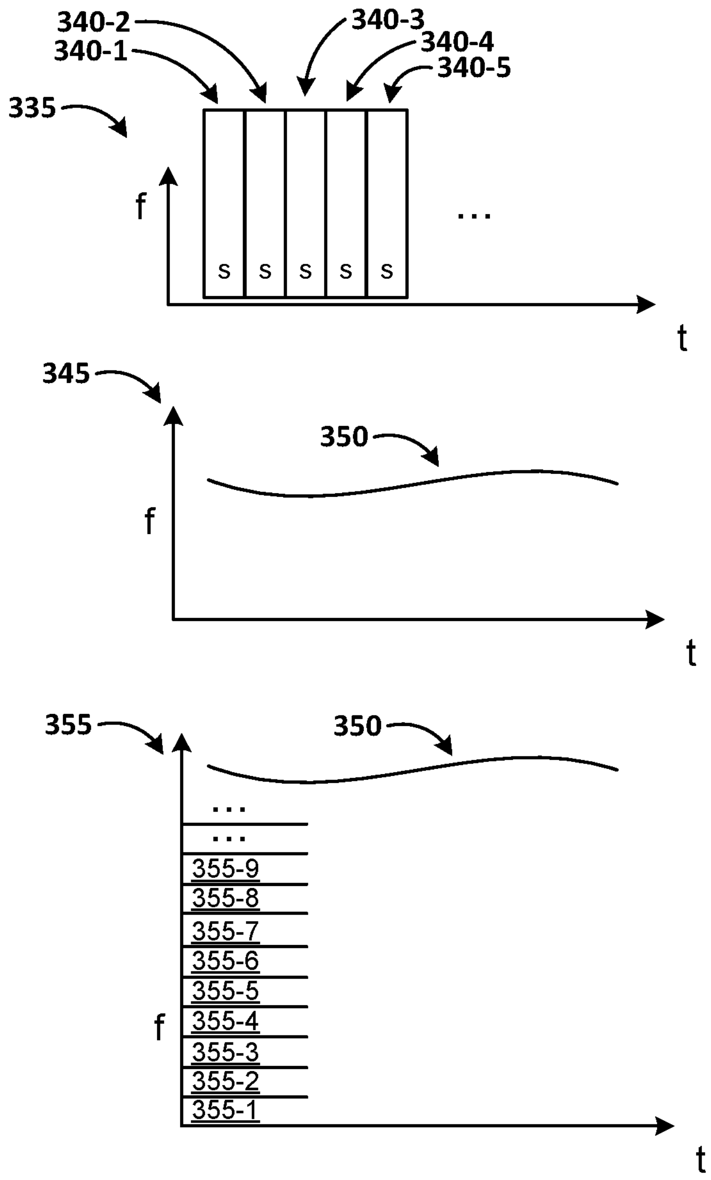

FIGS. 3A and 3B pictorially illustrate a flow for audio separation according to an example implementation. As shown in FIG. 3A, an amplitude vs time graph 305 illustrates an audio signal 310 that can continue on for a period of time. The audio signal 310 can have an amplitude per time. The amplitude of the audio signal 310 can have a frequency component. The time graph 315 illustrates a long window/short step integral transform operation. Blocks 320-1, 320-2, 320-3, 320-4, and 320-5 illustrate transforms (e.g., FFT, DCT, and the like) having a window length w (e.g., a long window). Block 320-1 illustrates a first transform operation that can be performed on audio signal 310. Block 320-2 illustrates a second transform operation that can be performed on the audio signal 310 that is performed a step size s (e.g., a short step) after the first transform operation of block 320-1 begins. Block 320-3 illustrates a third transform operation that can be performed on the audio signal 310 that is performed a step size s (e.g., a short step) after the second transform operation of block 320-2 begins. Block 320-4 illustrates a fourth transform operation that can be performed on the audio signal 310 that is performed a step size s (e.g., a short step) after the third transform operation of block 320-3 begins. Block 320-5 illustrates a fifth transform operation that can be performed on the audio signal 310 that is performed a step size s (e.g., a short step) after the fourth transform operation of block 320-4 begins. The long window/short step integral transform operation can continue as long as the audio signal 310 is to be, for example, compressed.

To complete the blocking/transform operation, the output of each long window/short step integral transform operation can be combined to generate transformed audio blocks 330-1 and 330-2 illustrated in the time graph 315. Combining the output of each long window/short step integral transform operation can include combining at least a portion of the output of each of the transforms associated with blocks 320-1, 320-2, 320-3, 320-4, and 320-5. For example, transformed audio block 330-1 can include the output of the transform associated with block 320-1 and a portion of the output of each of the transforms associated with blocks 320-2, 320-3, 320-4, and 320-5. For example, transformed audio block 330-2 can include the output of the transform associated with block 320-2 and a portion of the output of each of the transforms associated with blocks 320-1, 320-3, 320-4, and 320-5. Generating transformed audio blocks can continue as long as the audio signal 310 is to be, for example, compressed.

Referring to FIG. 3B, a frequency vs time graph 335 illustrates an interpolation transformed audio blocks 330-1 and 330-2 that can continue on for a period of time as long as the audio signal 310 is to be, for example, compressed. Each block 340-1, 340-2, 340-3, 340-4, and 340-5 can represent interpolated values (e.g., amplitude) associated with each frequency in the transformed audio blocks 330-1 and 330-2 within a time span equal to the step size s (e.g., a short step). In an example implementation, the interpolation can be implemented using an infinite impulse response filter that uses the summing properties of the integral transforms to compute the average amplitudes for the frequencies captured by the integral transforms on a step-size level of time resolution.

A frequency vs time graph 345 illustrates a high-resolution time-frequency representation 350 of the blocks 340-1, 340-2, 340-3, 340-4, and 340-5 representing interpolated values associated with each frequency in the transformed audio blocks 330-1 and 330-2. A frequency vs time graph 355 illustrates a masking model of the high-resolution time-frequency representation 350. The masking model can be configured to separate the audio in the time-frequency domain. The masking model can be a function that applies the masking properties of human hearing to the high-resolution time-frequency representation 350. The masking model can be based on, for example, the Bark frequency scale. The Bark frequency scale can be configured to model the bands of human hearing and a masking function describing how louder sounds hide less loud sounds to output the subjective loudness of each frequency. The bands (e.g., of human hearing) 355-1, 355-2, 355-3, 355-4, 355-5, 355-6, 355-7, 355-8, and 355-9 can represent bands in which the masking function assigns values associated with the high-resolution time-frequency representation 350.

Figure 4:
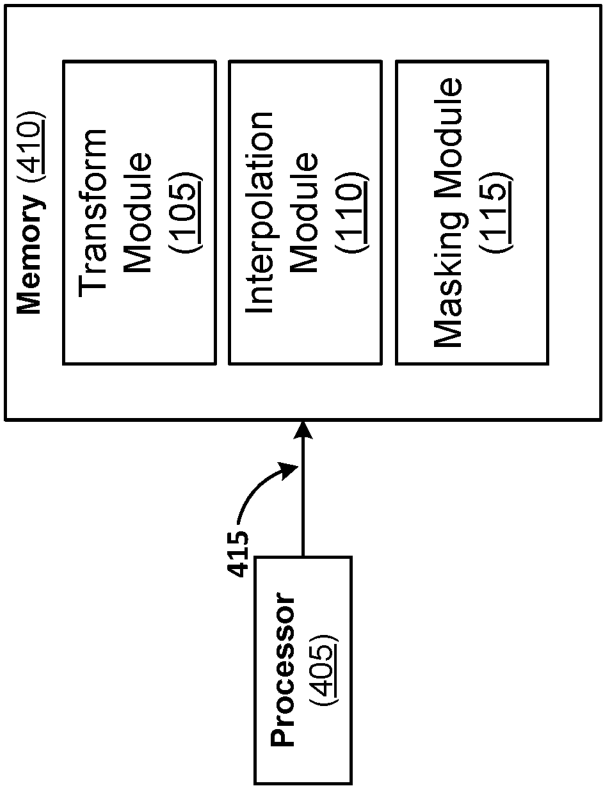
FIG. 4 illustrates a block diagram of a system according to an example implementation.

FIG. 4 illustrates a block diagram of a system according to an example implementation. In the example of FIG. 4, the system (e.g., an augmented reality system, a virtual reality system, and/or any system configured to read (e.g., text-to-voice, translate) a document) can include a computing system or at least one computing device and should be understood to represent virtually any computing device configured to perform the techniques described herein. As such, the device may be understood to include various components which may be utilized to implement the techniques described herein, or different or future versions thereof. By way of example, the system can include a processor 405 and a memory 410 (e.g., a non-transitory computer readable memory). The processor 405 and the memory 410 can be coupled (e.g., communicatively coupled) by a bus 415.

The processor 405 may be utilized to execute instructions stored on the at least one memory 410. Therefore, the processor 405 can implement the various features and functions described herein, or additional or alternative features and functions. The processor 405 and the at least one memory 410 may be utilized for various other purposes. For example, the at least one memory 410 may represent an example of various types of memory and related hardware and software which may be used to implement any one of the modules described herein.

The at least one memory 410 may be configured to store data and/or information associated with the device. The at least one memory 410 may be a shared resource. Therefore, the at least one memory 410 may be configured to store data and/or information associated with other elements (e.g., image/video processing or wired/wireless communication) within the larger system. Together, the processor 405 and the at least one memory 410 may be utilized to implement the techniques described herein. As such, the techniques described herein can be implemented as code segments (e.g., software) stored on the memory 410 and executed by the processor 405. Accordingly, the memory 410 can include the transform module 105, the interpolation module 110, and the masking module 115.

Reference is made above to a psychoacoustic model. The masking model can be based on a psychoacoustic model. The psychoacoustic model can be based on psychoacoustics. Audio compression algorithms can compress audio by removing acoustically irrelevant portions of an audio signal. The algorithm can take advantage of the human ears inability to hear quantization noise under conditions of auditory masking. This masking is a perceptual property of the human ear that occurs whenever the presence of a strong audio signal makes a temporal or spectral neighborhood of weaker audio signals imperceptible. For example, empirical data show that the human ear has a limited, frequency-dependent resolution. This dependency can be expressed in terms of critical-band widths that are less than 100 Hz for the lowest audible frequencies and more than 4 kHz at the highest. The human ear can blur the various signal components within a critical band. The noise-masking threshold at any given frequency can depend on the signal energy within a limited bandwidth neighborhood of that frequency because of the human ear's frequency-dependent resolving power. The masking model can operate by dividing the audio signal into frequency sub-bands that approximate critical bands, then quantizing each sub-band according to the audibility of quantization noise within that band.

The psychoacoustic model can analyze an audio signal and compute the amount of noise masking available as a function of frequency. The masking ability of a given signal component depends on its frequency position and its loudness. There can be considerable freedom in the implementation of a psychoacoustic model. The required accuracy of the model can depend on a target compression factor and an intended application.

Reference is made above to an infinite impulse response (IIR) filter. An IIR filter can be implemented as a recursive filter. For example, an IIR filters response may not settle to zero. The impulse response of many IIR filters may approach zero asymptotically. Referring to FIGS. 3A and 3B, the overlapping of the interpolation transformed audio blocks 330-1 and 330-2 can be implemented using an IIR filter that uses the summing properties of the integral transforms to compute the average amplitudes for the frequencies captured by the integral transforms on a step-size level of time resolution. The IIR filter can be recursive because of the overlapping of the long window/short step integral transform operation (e.g., the overlapping in time of the blocks 320-1, 320-2, 320-3, 320-4, and 320-5).

Example implementations can improve audio compression technologies in general, such as MP3 or Opus, to produce higher fidelity (e.g., at least a 1.5× improvement) at the same bit rate, or the same fidelity at, for example, at least 1/1.5× the bit rate. Other, or custom tuned audio compression technology can get at least 2× improvement over existing technologies using the implementation(s) described above.

Figure 5:
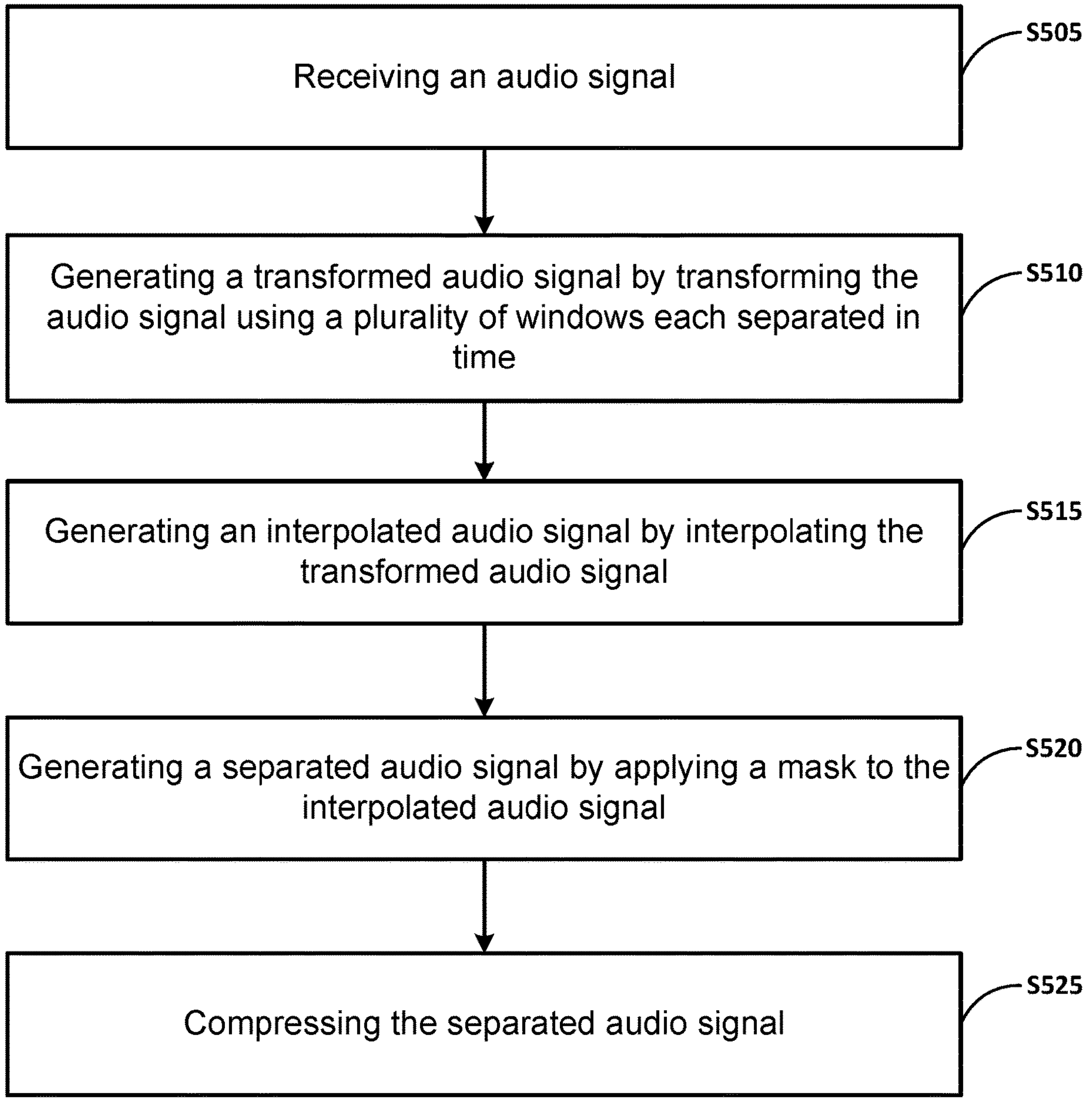
FIG. 5 illustrates a block diagram of a method for compressing audio according to an example implementation.

Example 1. FIG. 5 is a block diagram of a method of compressing an audio signal according to an example embodiment. As shown in FIG. 5, in step S505 receiving an audio signal. In step S510 generating a transformed audio signal by transforming the audio signal using a plurality of windows each separated in time. In step S515 generating an interpolated audio signal by interpolating the transformed audio signal. In step S520 generating a separated audio signal by applying a mask to the interpolated audio signal. In step S525 compressing the separated audio signal.

Example 2. The method of Example 1, wherein a window of the plurality of windows can be configured to enable time sampling (or time sample) the audio signal over a period of time, the generating of the transformed audio signal can include transforming the audio signal associated with the window from a time domain to a frequency domain, the plurality of windows can have a window length that is longer than a step size of the separation in time and the transforming can use an integral transform.

Example 3. The method of Example 1, wherein the generating of the interpolated audio signal can include using an infinite impulse response filter that uses a summing property of the transform to compute the average amplitude for a frequency of the transform.

Example 4. The method of Example 1, wherein the mask can be configured to separate the interpolated audio signal in the time-frequency domain and the separating of the interpolated audio signal in the time-frequency domain can use a bandpass filter.

Example 5. The method of Example 1, wherein the applying of the mask to the interpolated audio signal can include applying a masking property of human hearing to the interpolated audio signal.

Example 6. The method of Example 1, wherein the applying of the mask to the interpolated audio signal can include using a Bark frequency scale configured to model the bands of human hearing and a masking function describing how louder sounds hide less loud sounds to output the subjective loudness of each frequency.

Example 7. The method of Example 1, wherein the separated audio signal includes frequency bands over time where the frequency bands include the subjective loudness of each frequency.

Example 8. A method can include any combination of one or more of Example 1 to Example 7.

Example 9. A non-transitory computer-readable storage medium comprising instructions stored thereon that, when executed by at least one processor, are configured to cause a computing system to perform the method of any of Examples 1-8.

Example 10. An apparatus comprising means for performing the method of any of Examples 1-8.

Example 11. An apparatus comprising at least one processor and at least one memory including computer program code, the at least one memory and the computer program code configured to, with the at least one processor, cause the apparatus at least to perform the method of any of Examples 1-8.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

Various implementations of the systems and techniques described herein can be realized in digital electronic circuitry, integrated circuitry, specially designed ASIC s (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:

receiving an audio signal;

generating a transformed audio signal by transforming the audio signal using a plurality of windows each separated in time, the plurality of windows having a window length that is longer than a step size of the separation in time;

deconvolving the transformed audio signal to generate an interpolated audio signal having a time resolution based on the step size and a frequency resolution based on the window length;

generating a separated audio signal by applying a mask to the interpolated audio signal; and compressing the separated audio signal.

2. The method of claim 1, wherein a window of the plurality of windows is configured to enable time sampling the audio signal over a period of time, the generating of the transformed audio signal includes transforming the audio signal associated with the window from a time domain to a frequency domain, the plurality of windows have a window length that is longer than a step size of the separation in time, and the transforming uses an integral transform.

3. The method of claim 1, wherein the generating of the interpolated audio signal includes using an infinite impulse response filter that uses a summing property of the transform to compute the average amplitude for a frequency of the transform.

4. The method of claim 1, wherein the mask is based on a psychoacoustic model, the mask is configured to separate the interpolated audio signal in the time-frequency domain, and the separating of the interpolated audio signal in the time-frequency domain uses a bandpass filter.

5. The method of claim 1, wherein the applying of the mask to the interpolated audio signal includes applying a masking property of human hearing to the interpolated audio signal.

6. The method of claim 1, wherein the applying of the mask to the interpolated audio signal includes using a Bark frequency scale configured to model the bands of human hearing and a masking function describing how louder sounds hide less loud sounds to output the subjective loudness of each frequency.

7. The method of claim 1, wherein the separated audio signal includes frequency bands over time where the frequency bands include the subjective loudness of each frequency.

8. A non-transitory computer-readable storage medium comprising instructions stored thereon that, when executed by at least one processor, are configured to cause a computing system to:

receive an audio signal;

generate a transformed audio signal by transforming the audio signal using a plurality of windows each separated in time, the plurality of windows having a window length that is longer than a step size of the separation in time;

deconvolving the transformed audio signal to generate an interpolated audio signal having a time resolution based on the step size and a frequency resolution based on the window length;

generate a separated audio signal by applying a mask to the interpolated audio signal; and compress the separated audio signal.

9. The non-transitory computer-readable storage medium of claim 8, wherein the plurality of windows have a window length that is longer than a step size of the separation in time, and the transforming uses an integral transform.

10. The non-transitory computer-readable storage medium of claim 8, wherein the generating of the interpolated audio signal includes using an infinite impulse response filter that uses a summing property of the transform to compute the average amplitude for a frequency of the transform.

11. The non-transitory computer-readable storage medium of claim 8, wherein the mask is configured to separate the interpolated audio signal in the time-frequency domain.

12. The non-transitory computer-readable storage medium of claim 8, wherein the applying of the mask to the interpolated audio signal includes applying a masking property of human hearing to the interpolated audio signal.

13. The non-transitory computer-readable storage medium of claim 8, wherein the applying of the mask to the interpolated audio signal includes using a Bark frequency scale configured to model the bands of human hearing and a masking function describing how louder sounds hide less loud sounds to output the subjective loudness of each frequency.

14. The non-transitory computer-readable storage medium of claim 8, wherein the separated audio signal includes frequency bands over time where the frequency bands include the subjective loudness of each frequency.

15. An apparatus comprising:

at least one processor; and at least one memory including computer program code;

the at least one memory and the computer program code configured to, with the at least one processor, cause the apparatus to:

receive an audio signal;

generate a transformed audio signal by transforming the audio signal using a plurality of windows each separated in time, the plurality of windows having a window length that is longer than a step size of the separation in time;

deconvolving the transformed audio signal to generate an interpolated audio signal having a time resolution based on the step size and a frequency resolution based on the window length;

generate a separated audio signal by applying a mask to the interpolated audio signal; and compress the separated audio signal.

16. The apparatus of claim 15, wherein the plurality of windows have a window length that is longer than a step size of the separation in time, and the transforming uses an integral transform.

17. The apparatus of claim 15, wherein the generating of the interpolated audio signal includes using an infinite impulse response filter that uses a summing property of the transform to compute the average amplitude for a frequency of the transform.

18. The apparatus of claim 15, wherein the mask is configured to separate the interpolated audio signal in the time-frequency domain.

19. The apparatus of claim 15, wherein the applying of the mask to the interpolated audio signal includes applying a masking property of human hearing to the interpolated audio signal.

20. The apparatus of claim 15, wherein the applying of the mask to the interpolated audio signal includes using a Bark frequency scale configured to model the bands of human hearing and a masking function describing how louder sounds hide less loud sounds to output the subjective loudness of each frequency.

21. The apparatus of claim 15, wherein the separated audio signal includes frequency bands over time where the frequency bands include the subjective loudness of each frequency.

* * * * *